United States Patent
Saur et al.

[11] Patent Number: 6,101,987
[45] Date of Patent: Aug. 15, 2000

[54] METHOD AND APPARATUS FOR COMBINED OPERATION OF A THERMOSTATIC VALVE AND A RADIATOR FAN

[75] Inventors: Roland Saur, Stuggart; Peter Leu, Ostfildern-Nellingen; Gunter Kalmbach, Grosserlach, all of Germany

[73] Assignee: Behr Thermot-Tronik GmbH & Co., Germany

[21] Appl. No.: 09/110,635

[22] Filed: Jul. 6, 1998

[30] Foreign Application Priority Data

Jul. 5, 1997 [DE] Germany ............................ 197 28 814

[51] Int. Cl.$^7$ ....................................... F01P 7/02
[52] U.S. Cl. .................. 123/41.1; 123/41.12; 123/41.18
[58] Field of Search ................. 123/41.1, 41.12, 123/41.48

[56] References Cited

U.S. PATENT DOCUMENTS

| | | | |
|---|---|---|---|
| 4,475,485 | 10/1984 | Sakakibara et al. | |
| 4,522,334 | 6/1985 | Saur | 236/34.5 |
| 4,537,158 | 8/1985 | Saur | 123/41.1 |
| 4,674,679 | 6/1987 | Saur | 236/34.5 |
| 4,726,325 | 2/1988 | Itakura | |
| 4,955,431 | 9/1990 | Saur et al. | 165/271 |
| 5,385,296 | 1/1995 | Kurz et al. | 236/34.5 |
| 5,482,010 | 1/1996 | Lemberger et al. | 123/41.1 |
| 5,494,005 | 2/1996 | Saur | 123/41.1 |
| 5,566,745 | 10/1996 | Hill et al. | 165/299 |
| 5,617,816 | 4/1997 | Saur et al. | 123/41.08 |
| 5,619,957 | 4/1997 | Michels | |
| 5,692,460 | 12/1997 | Froeschl et al. | 123/41.1 |
| 5,711,258 | 1/1998 | Saur | 123/41.29 |
| 5,738,276 | 4/1998 | Saur | 236/92 C |
| 5,775,270 | 7/1998 | Huemer et al. | 123/41.1 |
| 5,799,625 | 9/1998 | Ziolek et al. | 123/41.1 |
| 5,836,269 | 11/1998 | Schneider | 123/41.1 |

FOREIGN PATENT DOCUMENTS

| | | |
|---|---|---|
| 30 24 209 A1 | 1/1981 | Germany. |
| 33 20 338 A1 | 6/1984 | Germany. |
| 40 09 562 A1 | 10/1991 | Germany. |
| 41 09 498 A1 | 9/1992 | Germany. |
| 44 09 547 A1 | 1/1995 | Germany. |
| 195 00 648 A1 | 7/1996 | Germany. |

OTHER PUBLICATIONS

Search Report, Sep. 30, 1999, France.

*Primary Examiner*—Marguerite McMahon
*Assistant Examiner*—Jason Benton
*Attorney, Agent, or Firm*—Kennedy Covington Lobdell & Hickman

[57] ABSTRACT

A method of cooling coolant in a coolant circuit of an internal combustion engine of a motor vehicle includes: evaluating parameters of the internal combustion engine and the motor vehicle with a thermostatic valve control device; based on the evaluation of the parameters, controlling with the thermostatic valve control device adjustment of a thermostatic valve for controlling coolant flow from a radiator and coolant flow from a bypass line around the radiator into a combined coolant flow to the internal combustion engine; communicating a signal based on the evaluation of the parameters from the thermostatic valve control device to a fan control device which controls operation of a fan that cools coolant in the radiator to a target temperature; and setting the target temperature of the fan control device through the communication. Subsequently, the fan control device controls the cooling by the fan as a function of the target temperature set by the signal received from the thermostatic valve control device.

11 Claims, 2 Drawing Sheets

METHOD AND APPARATUS FOR COMBINED OPERATION OF A THERMOSTATIC VALVE AND A RADIATOR FAN

FIELD OF THE PRESENT INVENTION

The present invention relates to a cooling system for an internal combustion engine of a motor vehicle and a method of cooling coolant circulated through a cooling circuit of the cooling system, wherein the cooling system includes: a thermostatic valve which regulates coolant flow through a bypass line and coolant flow through a coolant radiator into a combined coolant flow through an engine inlet, and which can be adjusted to various open positions for varying the coolant temperature of the combined coolant flow by a control device that evaluates operational parameters of the internal combustion engine and ambient parameters of the motor vehicle; and a fan which cools coolant passing through the radiator and which is controlled by a fan control device.

BACKGROUND OF THE PRESENT INVENTION

A cooling system is disclosed in German Patent Publication DE 44 09 547 A1, to which U.S. Pat. No. 5,482,010 in part corresponds, wherein a thermostatic valve is adjusted to various open positions for varying the coolant temperature of a combined coolant flow to the engine inlet by a control device, and wherein the thermostatic valve control device evaluates operational parameters of the internal combustion engine and ambient parameters of the motor vehicle and adjusts the thermostatic valve as a function of the evaluations. The cooling system further includes a fan that is directly controlled by a fan control device and the thermostatic valve control device communicates a signal to the fan control device which turns the fan on or, alternatively, increases the rpm of the fan if it is already on, when rapid cooling of the coolant passing through the radiator is desired. Furthermore, a timer limits the period of time during which the fan is run (or run at higher rpms) in response to the signal from the thermostatic valve control device.

A cooling system is also disclosed in German Patent Publication DE 195 00 648 A, to which U.S. Pat. No. 5,617,816 corresponds, wherein the thermostatic valve is adjusted to various open positions for varying the coolant temperature of a combined coolant flow to the engine inlet by a control device, and wherein the thermostatic valve control device evaluates operational parameters of the internal combustion engine and ambient parameters of the motor vehicle and adjusts the thermostatic valve as a function of the evaluations. The cooling system further includes a fan that is directly controlled by a fan control device. The fan control device further includes a circuit with a temperature comparison stage in which the actual temperature of the coolant is compared with a set value and which, if the set value is exceeded, forms a temperature signal that is applied to an input of an AND circuit of the fan control device. If a switching signal for adjusting the thermostatic valve to a position for a lower coolant temperature is applied to the other input of the AND circuit, the AND circuit generates a signal that activates the fan.

SUMMARY OF THE PRESENT INVENTION

An object of the present invention is to provide an improved method for and improved apparatus of a cooling system that includes a thermostatic valve, a radiator fan, and respective control devices therefor. This object is achieved in the present invention by communicating from the thermostatic valve control device signals representative of evaluated operational parameters and ambient parameters of the engine and vehicle to the fan control device. Specifically, the signals set the target temperature of the fan control device and the fan control device determines the fan output as a function thereof. The thermostatic valve control device provides information signals regarding the target temperature of the coolant and relies upon the fan control device, which is otherwise conventional, to determine the fan output in connection with the set target temperature. Furthermore, in accordance with the present invention, the fan control device can be integrated into a known engine control device and can operate in a conventional manner in the overall cooling process of the internal combustion engine as a function of the operational parameters of the engine and/or the ambient parameters of the vehicle detected by the engine control device.

In the method of operating the thermostatic valve control device of the present invention, an execution program is provided which includes a set-up routine that is executed at the start of the internal combustion engine and contains a step which initially sets the target temperature of the fan control device at a predetermined high temperature. At the start of the internal combustion engine, the fan control device therefore generates cooling as a function of the high target temperature and permits a quick warm-up of the engine from the cold state.

In a further feature of the present invention the set-up routine contains a step which accesses from a memory threshold values for steps to be performed later in a main routine of the program. Furthermore, these threshold values can be stored in memory preferably as characteristic diagrams.

In another feature of the present invention, the program includes a main routine in a step of which the actual coolant temperature is compared with a threshold value and, until the threshold value is reached, a signal is sent to the fan control device prohibiting operation of the fan thereby insuring that the fan is not operated prematurely.

In yet a further feature of the present invention the main routine contains a plurality of steps which compare a threshold value with an actual value of an operational parameter of the internal combustion engine or an ambient parameter of the motor vehicle, and which send a signal for lowering the target temperature of the coolant to the fan control device when a threshold value has been reached or exceeded.

In another feature of the present invention, a low target temperature of the coolant is set for the fan control device only under limited operating conditions determined by the thermostatic valve control device, so that a high target temperature of the coolant is set for the fan control device under the other operating conditions at which no high cooling output is required whereby the internal combustion engine is operated in a correspondingly advantageous manner.

In yet another feature of the present invention a step of the main routine compares the actual coolant temperature with a maximum threshold value and, when the threshold value is exceeded, the target temperature of the coolant is lowered, and preferably to the lowest target temperature. A failsafe is thus provided whereby, if for some reason there is a danger of overheating resulting from, for example, a dirty coolant radiator, then the lowest target temperature will be set and maximum cooling will be achieved.

In still yet another feature of the present invention the thermostatic valve contains a thermostatic operating element adjacent which an electrical heating element is disposed. Expansion and contraction of the thermostatic element effects adjustment of the thermostatic valve which adjusts the coolant temperature of the combined coolant flow to the engine. The thermostatic control device consequently includes means for controlling the current supplied to the electrical heating element for controlling the heat output thereof. It is thus possible to realize a dynamic behavior without the thermostatic operating element being overheated and, in particular, it is possible to generate an initially large heat output for quick adjustment of the thermostatic valve and, after a predetermined period of time, generate a reduced heat output for maintaining the thermostatic valve in its open position but without overloading the thermostatic operating element.

In an additional aspect of this feature, the control device includes a time measuring device which limits the time that the electrical heating element generates the high heat output, after which the control device reduces the heat output. Preferably, the control device contains a pulse emitter for generating the reduced heat output, which provides current to the heating element in pulses with interspersed pulse pauses. The heat output can then be reduced in a simple manner to the desired value by variations of the duration of the pulses or the pulse pauses.

Briefly described, the present invention includes a cooling system for an internal combustion engine of a motor vehicle, comprising: a coolant circuit for circulating a fluid coolant therethrough with the coolant circuit including an engine outlet conduit, an engine inlet conduit, a radiator connected between the engine outlet conduit and the engine inlet conduit, and a bypass line connecting the engine outlet conduit to the engine inlet conduit for coolant flow around the radiator; a fan for cooling the coolant disposed adjacent the radiator and a fan control device for controlling cooling of the coolant passing through the radiator to a target temperature; a thermostatic valve disposed in the circuit for adjusting coolant flow between the radiator and the bypass line and therefrom to the internal combustion engine; a temperature sensor disposed in the engine outlet conduit for measuring the temperature of the coolant flowing therethrough; an engine control device that detects parameters of the internal combustion engine and of the motor vehicle; and means for receiving and evaluating the parameters detected by the engine control device, for receiving and evaluating the temperature of the coolant measured by the sensor, for controlling adjustment of the thermostatic valve as a function of the evaluations, and for communicating a signal to the fan control device as a function of the evaluations for setting the target temperature of the fan control device.

A method of operating a thermostatic valve control device of a cooling circuit in accordance with the present invention generally includes the main steps of controlling with a thermostatic valve control device adjustment of a thermostatic valve for controlling coolant flow from a radiator and coolant flow from a bypass line around the radiator into a combined coolant flow to the internal combustion engine; communicating a signal from the thermostatic valve control device to a fan control device which controls operation of a fan that cools coolant in the radiator as a function of a target temperature; and setting the target temperature of the fan control device through said communication.

Preferably, the method includes first performing the steps of a set-up routine and then repeatedly performing steps of a main routine: wherein the set-up routine includes the step of accessing threshold values from memory associated with the thermostatic valve control device; and wherein the main routine includes the steps of:

(i) evaluating the temperature of the coolant against threshold values therefor;

(ii) evaluating parameters of the internal combustion engine and the motor vehicle against threshold values therefor;

(iii) based on the evaluations, controlling a thermostatic valve disposed in the coolant circuit;

(iv) communicating signals based on the evaluations to a fan control device which controls operation of a fan that cools coolant passing through a radiator as a function of a target temperature;

(v) overriding the fan control device and prohibiting operation of the fan through such communications; and (vi) setting the target temperature of the fan control device through such communications.

BRIEF DESCRIPTION OF THE DRAWINGS

Further characteristics and advantages of the present invention ensue from the following description, wherein.

DETAILED DESCRIPTION OF THE PREFERRED EMBODIMENT

Figure 1:
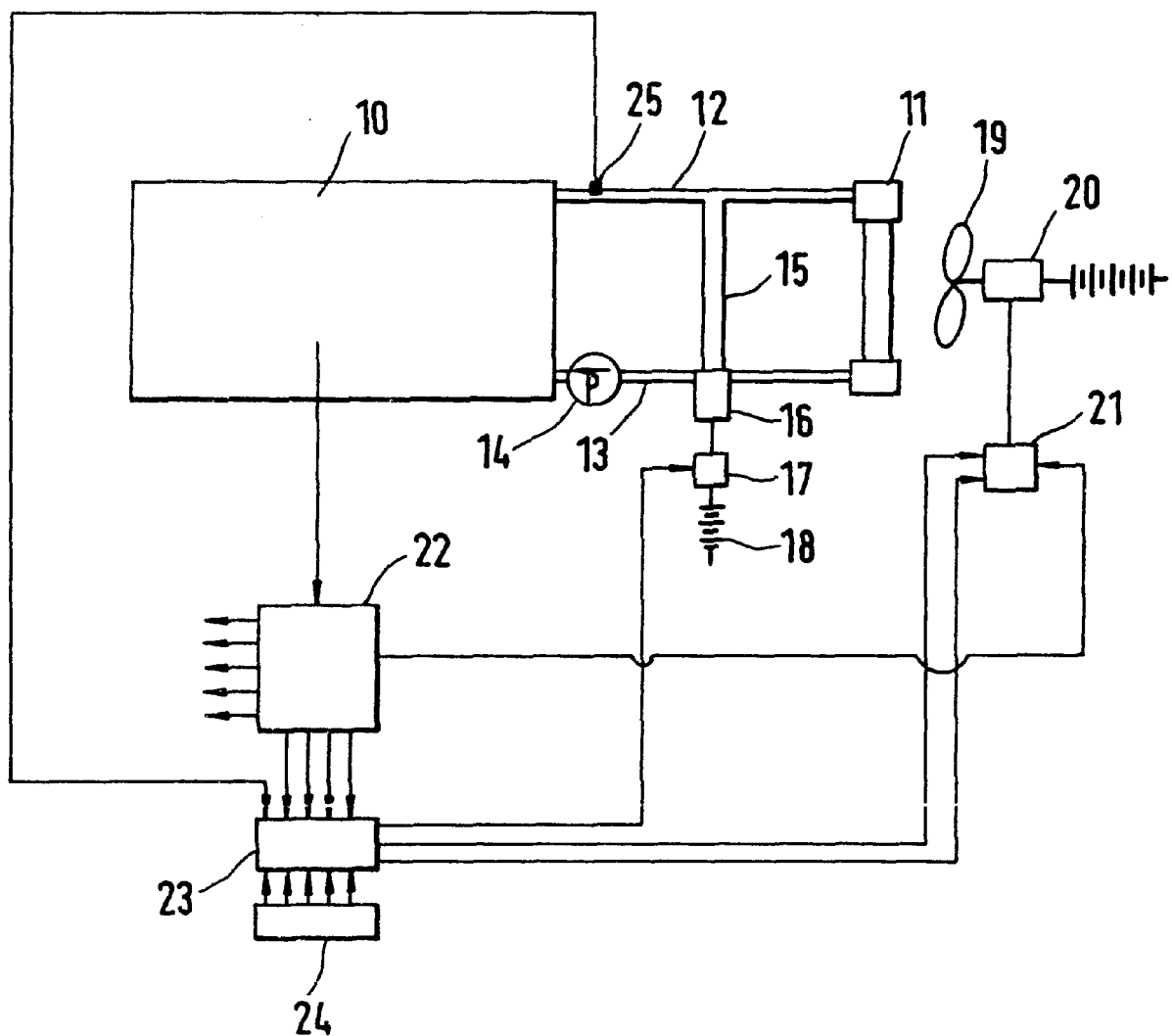
FIG. 1 is a schematic illustration of a preferred cooling system for an internal combustion engine of a motor vehicle in accordance with the present invention, the cooling system including a thermostatic valve control device.

A coolant circuit for a liquid-cooled internal combustion engine of a motor vehicle is schematically shown in FIG. 1 and includes an engine 10 and a coolant radiator 11. An engine outlet line 12 leads from the internal combustion engine 10 to the coolant radiator 11 and an engine inlet line 13 leads from the coolant radiator 11 back to the engine 10. Moreover, a coolant pump 14 is disposed within the engine inlet line 13 for circulation of the coolant.

A bypass line 15 is also included in the coolant circuit for bypass of the radiator 11 by the coolant flowing from the engine 10. The bypass line 15 is arranged between the engine outlet line 12 and the engine inlet line 13 and connects with the engine inlet line 13 by means of a conventional thermostatic valve 16 which controls the amount of coolant that flows through the bypass line 15 and that flows through the radiator 11 for adjusting the temperature of the combined coolant that flows to the engine 10. This conventional thermostatic valve 16, which preferably corresponds to the thermostatic valve disclosed in German Patent Publication DE 42 33 913 A, contains a thermostatic operating element with which an electric heating element is disposed. The electric heating element is connected with a current source 18 by means of a switching member 17 and, when current passes through the electric heating element, the thermostatic operating element is heated and expands resulting in adjustment of the thermostatic valve 16.

A fan 19 is disposed adjacent to the radiator 11 in the coolant circuit and includes an electric drive motor 20 controlled by a fan control device 21. The fan control device 21, which has been represented separately only for reasons of clarity, typically comprises a component of an electronic engine control device 22, such as is sold, for example, by Robert Bosch GmbH of Germany under the trademark "Motronic".

In a manner not represented in detail herein but which is conventional and well-known to one having ordinary skill in the art, the engine control device 22 detects operational parameters of the internal combustion engine and ambient parameters of the vehicle in which it is installed. The engine control device 22 evaluates these parameters with operating conditions stored in characteristic diagrams and then formulates control commands for the engine 10 relating, in particular, to the supply of fuel to the engine 10. The parameters preferably detected by the engine control device 22 include the temperature of the aspirated air, i.e., air in the intake tube of the engine 10, the load of the engine, the rpm of the engine, and the speed of the vehicle powered by the engine.

A thermostatic valve control device 23 is provided for the thermostatic valve 16 for controlling the heating of the thermostatic operating element of the thermostatic valve 16 via an electrical heating element disposed adjacent thereto and to which a current is supplied. Memory 24 is connected to the thermostatic valve control device 23 in which are stored threshold values for evaluating the operational parameters and ambient parameters detected by the engine control device 22. Preferably, the threshold values are stored in the form of characteristic diagrams which are entered into and processed by the thermostatic valve control device 23 in accordance with the preferred method of operation of the thermostatic valve control device 23 illustrated in FIG. 2 and explained in detail presently. The engine control device 22 is connected to the thermostatic valve control device 23 for the provision of the parameters detected by the engine control device 22 and a temperature sensor 25 further is connected to the thermostatic valve control device 23 and measures for and provides to the thermostatic valve control device 23 the actual temperature of the coolant in the engine outlet line 12 for comparison with the stored threshold values in the memory 24.

Figure 2:
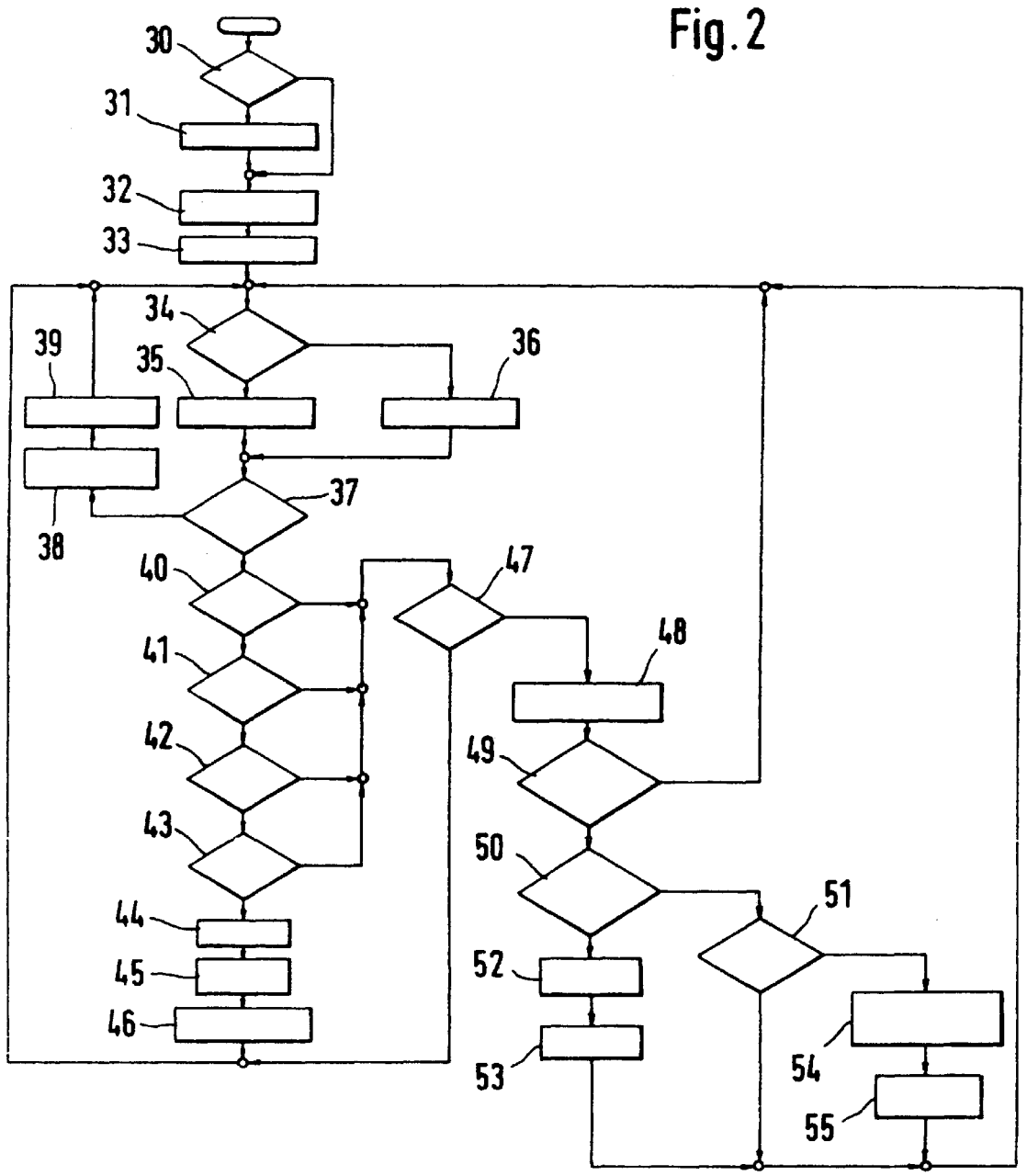
FIG. 2 illustrates a flow chart for the preferred method of operation of the thermostatic valve control device of FIG. 1.

A flow chart of the preferred program for operating the thermostatic valve control device 23 is illustrated in FIG. 2. The program includes an initial set-up routine which is executed following the starting of the engine 10 and a main routine which is continuously repeated thereafter. The set-up routine includes the following steps. First, in a step 30 a determination is made whether a provided diagnostic system is operating correctly. If the determination is negative, then the set-up routine proceeds to a step 31 in which the negative determination is recorded in an error memory of the diagnostic system. The set-up routine then proceeds to a step 32 in which a signal is generated to the fan control device 21 setting the target temperature of the coolant at a predetermined upper temperature, e.g., 108° C. If the determination in step 30 is positive, then the set-up routine proceeds to step 32 and bypasses step 31.

From step 32, the set-up routine proceeds to a step 33 in which the threshold values stored in memory 24 are accessed for use in the main routine. Preferably, these threshold values are retained in the memory 24 as characteristic diagrams. Following step 32, the set-up routine ends and the main routine is executed and continuously repeated.

The main routine begins with a beginning step 34 in which a determination is made whether the actual coolant temperature measured by the sensor 25 exceeds a minimum threshold value of the coolant temperature which is preferably set at 95° C. If the determination in step 34 is negative, then the main routine proceeds to a step 35 in which a signal is generated to the fan control device 21 prohibiting operation of the fan, whereby the fan 19 will not prematurely be operated which would delay the reaching of the operating temperature. If the determination in step 34 is affirmative, then the main routine proceeds to a step 36 in which a signal is generated to the fan control device 21 permitting operation of the fan 19.

Thereafter the main routine proceeds to a step 37 in which a determination is made whether the measured coolant temperature exceeds a maximum threshold value of the coolant temperature which is preferably set at 115° C.

If the determination in step 37 is affirmative, then the main routine proceeds to a step 38 in which the thermostatic operating element of the thermostatic valve 16 is heated in order to reduce the coolant temperature. This provides a failsafe preventing overheating which would otherwise occur in situations such as when the radiator 39 is dirty and flow therethrough is consequently reduced. Then, following step 38, the main routine proceeds to a step 39 in which a signal is generated to the fan control device 21 setting the target temperature of the coolant at a predetermined lower temperature, whereby the fan control device 21 will activate the fan 19 for appropriate cooling of the coolant passing through the radiator. Thereafter, the main routine returns to the beginning thereof, i.e., step 34.

If the determination in step 37 is negative, then the main routine proceeds preferably to a sequence of parameter comparator steps. Each comparator step of the sequence compares threshold values relating to the operational parameters of the internal combustion engine and/or ambient parameters thereof with actual measured values therefor. Preferably, the sequence includes four parameter comparator steps 40,41,42,43, but more or less such steps could be provided in accordance with the present invention as will be recognized by one of ordinary skill in the art.

In particular, in step 40 a determination is made whether a measured temperature of aspirated air to the engine 10 that is provided by the engine control device 22 exceeds a threshold value. In step 41 a determination is made whether an actual load value provided by the engine control device 22 exceeds a threshold value. In step 42 a determination is made whether vehicle speed provided by the engine control device 22 exceeds a threshold value, and in step 43 a determination is made whether engine rpm provided by the engine control device 22 exceeds a threshold value.

If each determination in the parameter comparator steps 40,41,42,43 is negative, then the main routine proceeds to a sequence of three steps 44,45,46. In the first step 44 any heating of the thermostatic operating element of the thermostatic valve 16 is discontinued. The main routine then proceeds to step 45 in which a time measuring device, explained in detail below, is reset. Next, the main routine proceeds to step 46 in which a signal is generated to the fan control device 21 for setting the target temperature for the coolant at the predetermined upper temperature during the actual operational state of the engine 10 and the motor vehicle equipped therewith. Thereafter, the main routine returns to the beginning step 34.

Alternatively, the main routine proceeds from step 40 to steps 41,42,43 in sequential order and, if in any step the determination is affirmative, then the main routine proceeds to a step 47 and the main routine does not proceed to any remaining parameter comparator steps in the sequence. In step 47 a determination is made whether the actual measured coolant temperature exceeds a threshold temperature, e.g., 90° C. If the determination in step 40 is negative, then the main routine repeats and returns to the beginning step 34.

If the determination in step 47 is affirmative, then the main routine proceeds on to another step 48 in which a signal is generated to the fan control device 21 setting the target temperature for the coolant at the predetermined lower temperature. The main routine then proceeds to a sequence of determination steps 49,50,51 which involve the controlling of the heating of the thermostatic element of the thermostatic valve 16 for further cooling of the engine 10. Specifically, in step 49 a determination is made whether the thermostatic element is currently being heated by a pulsed current. If the determination in step 49 is affirmative, then the main routine repeats by proceeding to step 34. If the determination of step 49 is negative, then the main routine proceeds to a step 50 in which a determination is made whether the thermostatic element of the thermostatic valve 16 is currently being heated by an unpulsed current. If the determination in step 50 is negative and the thermostatic element of thermostatic valve 16 is not being heated at all, then the main routine proceeds to a step 52 in which a time measuring device is activated for measuring a maximum actuation time period of unpulsed heating of the thermostatic valve 16 which, for example, preferably extends up to 30 seconds. The main routine then proceeds on to a step 53 in which an unpulsed current is supplied to the heating element and, thereafter, the main routine returns to the beginning step 34.

If, however, the determination in step 50 is affirmative, then the main routine proceeds to a step 51 in which a determination is made whether the maximum actuation time period for the unpulsed current supply which is measured by the time function element has expired. If this maximum actuation time period has yet to expire, then the main routine returns to beginning step 34. However, if the maximum actuation time period has expired, then the main routine proceeds to a step 54 in which a pulse emitter is activated whereby a pulsed or pulse-like modulated current is supplied to the heating element of the thermostatic operating element of the thermostatic valve 16. Thereafter, the main routine proceeds on to a step 55 in which the time function element is reset and then the main routine proceeds to the beginning step 34 and repeats.

Aspects of the operation of the thermostatic valve control device 23 can be generalized as follows. First in the main routine, a determination is made whether the coolant temperature has reached or exceeded a minimum temperature. In the situation where the operating temperature has not been reached, the minimum temperature will not have been reached and, therefore, the thermostatic valve control device 23 inhibits actuation of the fan 19 by the fan control device 21. If the minimum temperature has been reached, then the fan control device 21 is released and free to actuate the fan 19.

Next, a determination is made whether a maximum temperature has been reached or exceeded by the coolant temperature. If the maximum temperature has been reached or exceeded then a risk exists that the engine will overheat and both the thermostatic valve is opened (by heating the thermostatic element) and the fan is activated (by setting a low target temperature in the fan control device) for combined cooling of the coolant flowing to the engine.

If the maximum temperature has not been exceeded, then the operational and ambient parameters are evaluated against threshold values. If any parameter meets or exceeds a threshold value, then a check is made to determine if the coolant temperature has reached or exceeded a minimum temperature. In the case of the warm-up period of the engine the minimum temperature may not have been reached but one of the parameter comparator steps may nevertheless be affirmative. In this situation, no cooling should be initiated and the main routine restarts.

On the other hand, if the minimum temperature has been reached, then the lower target temperature is set in the fan control device for control of the fan in accordance therewith. Opening of the thermostatic valve is also initiated for opening of the thermostatic valve if heating is not underway, and if heating is underway, a check is made to determine if an initial heating period has expired whereby intermediate heating of the thermostatic valve occurs for maintaining the thermostatic valve in its open condition without overloading the thermostatic valve.

In particular, the thermostatic valve may be heated by supplying a constant current to a PTC resistor, in which case following step 48 a signal need only be sent for heating the thermostatic element. However, the thermostatic valve control device 23 preferably is capable of controlling the heat output of the heating element for varied opening of the thermostatic valve. Thus, when heating is first initiated, a high heat output is provided for a limited time for quick opening of the thermostatic valve. After this initial time period, the current supplied to the heating element becomes intermittent for reduced heat output which maintains the thermostatic element in its expanded condition without overloading it. Preferably, a pulse emitter is used after the initial time period for supplying a current to the heating element in pulses with interspersed pulse pauses, but with constant voltage. On the other hand, variations in the voltage could also be used in accordance with the present invention.

In additional comments, while the heating of the thermostatic element is also initiated in step 38, it is not necessary that the heating occur rapidly and therefore, a pulsed or pulse-like modulated current supply to the heating element would be satisfactory without the initial supply of a constant current as in step 53.

Finally, it is also possible that the engine may be turned off before the maximum time period measured by the time measuring device has expired. Hence, in step 44 heating is ceased and in step 45 the time measuring device is reset if these steps are reached by the main routine.

The present invention has been described with reference to an exemplary cooling system and method of operation thereof, wherein only two predetermined temperatures (an upper temperature and a lower temperature) for the target temperature of the coolant have been used. Furthermore, preferably at the upper predetermined temperature no heating of the thermostatic valve occurs and at the lower predetermined temperature the heating of the thermostatic element occurs. However, in accordance with the present invention and as one having ordinary skill in the art will recognize, a multitude of different target temperatures can be utilized which can be stored in a characteristic diagram formed on the basis of the operating parameters of the internal combustion engine and/or ambient parameters of the vehicle and which respectively can be called up under predetermined operating conditions. Moreover, the method of heating the thermostatic valve by the pulse-width modulated current supply is particularly well suited for the use of multiple target temperatures, since currents having various pulse-width modulations can be supplied to the thermostatic valve for varied adjustment of the thermostatic valve for varying the temperature of the coolant flowing to the engine.

It will therefore be readily understood by those persons skilled in the art that the present invention is susceptible of a broad utility and application. Many embodiments and adaptations of the present invention other than those herein described will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention, the present invention being limited only by the claims appended hereto and equivalents thereof.

What is claimed is:

1. A method of cooling coolant in a coolant circuit of an internal combustion engine of a motor vehicle, comprising the steps of,
    (a) controlling with a thermostatic valve control device adjustment of a thermostatic valve that controls coolant flow from a radiator and coolant flow from a bypass line around the radiator into a combined coolant flow to the internal combustion engine, said step of controlling the adjustment of the thermostatic valve including evaluating parameters of the internal combustion engine and the motor vehicle against respective threshold values;
    (b) communicating a signal representative of said evaluation of the parameters from the thermostatic valve control device to a fan control device that controls operation of a fan which cools coolant in the radiator as a function of a target temperature; and
    (c) setting the target temperature of the fan control device to either a predetermined high value or a predetermined low value based on said communicated signal from the thermostatic valve control device;
    (d) wherein said step of controlling the adjustment of the thermostatic valve includes adjusting the thermostatic valve to an open position and, in combination therewith, said step of setting of the target temperature includes setting the target temperature to the predetermined low value, when both (i) a said evaluated parameter exceeds a respective threshold value, and (ii) the temperature of the coolant is greater than a predetermined minimum operating temperature but is less than the predetermined low value for the target temperature.

2. A method of cooling coolant in a coolant circuit of an internal combustion engine of a motor vehicle, comprising the steps of,
    (a) controlling with a thermostatic valve control device adjustment of a thermostatic valve that controls coolant flow from a radiator and coolant flow from a bypass line around the radiator into a combined coolant flow to the internal combustion engine;
    (b) communicating a signal representative of said evaluation of the parameters from the thermostatic valve control device to a fan control device that controls operation of a fan which cools coolant in the radiator as a function of a target temperature;
    (c) setting the target temperature of the fan control device to either a predetermined high value or a predetermined low value based on said communicated signal from the thermostatic valve control device; and
    (d) communicating a signal from the thermostatic valve control device to the fan control device that overrides the fan control device and inhibits operation of the fan only when the temperature of the coolant does not exceed a predetermined minimum operating temperature, the predetermined minimum operating temperature being less than the predetermined low value for the target temperature.

3. A method of cooling coolant in a coolant circuit of an internal combustion engine of a motor vehicle, comprising the steps of,
    (a) controlling with a thermostatic valve control device adjustment of a thermostatic valve that controls coolant flow from a radiator and coolant flow from a bypass line around the radiator into a combined coolant flow to the internal combustion engine, said step of controlling the adjustment of the thermostatic valve including evaluating parameters of the internal combustion engine and the motor vehicle against respective threshold values;
    (b) communicating a signal representative of said evaluation of the parameters from the thermostatic valve control device to a fan control device that controls operation of a fan which cools coolant in the radiator as a function of a target temperature; and
    (c) setting the target temperature of the fan control device to either a predetermined high value or a predetermined low value based on said communicated signal from the thermostatic valve control device;
    (d) wherein said step of controlling the adjustment of the thermostatic valve includes adjusting the thermostatic valve to an open position and, in combination therewith, said step of setting of the target temperature includes setting the target temperature to the predetermined low value whenever the temperature of the coolant exceeds a predetermined maximum operating temperature.

4. A method of operating a thermostatic valve control device of a cooling circuit of a coolant for an internal combustion engine of a motor vehicle, comprising first performing a set-up routine and then performing a main routine:
    (a) wherein the set-up routine includes the step of accessing from a memory associated with the thermostatic valve control device threshold values for coolant temperature and for operating parameters of the internal combustion engine and the motor vehicle; and
    (b) wherein the main routine includes the steps of,
        (i) evaluating both the temperature of the coolant against a threshold value therefor representing a predetermined minimum operating temperature, and the parameters of the internal combustion engine and the motor vehicle against the threshold values therefor,
        (ii) based on said evaluations, controlling a thermostatic valve disposed in the coolant circuit and communicating a signal to a fan control device that controls operation of a fan which cools coolant in a radiator as a function of a target temperature, and
        (iii) setting the target temperature of the fan control device to either a predetermined low value or a predetermined high value through said communicated signal from the thermostatic control device, the predetermined minimum operating value being less than the predetermined low temperature,
        (iv) wherein said thermostatic control valve is opened and said target temperature is set to the predetermined low value when both (A) a parameter exceeds a threshold value therefor and (B) the coolant temperature exceeds the predetermined minimum operating temperature but is less than the predetermined low value for the target temperature.

5. A method of operating a thermostatic valve control device of a cooling circuit of a coolant for an internal combustion engine of a motor vehicle, comprising first performing a set-up routine and then performing a main routine:

(a) wherein the set-up routine includes the step of accessing from a memory associated with the thermostatic valve control device threshold values for coolant temperature and for operating parameters of the internal combustion engine and the motor vehicle; and (b) wherein the main routine includes the steps of,
  (i) evaluating both the temperature of the coolant against a threshold value therefor representing a predetermined minimum operating temperature, and the parameters of the internal combustion engine and the motor vehicle against the threshold values therefor,
  (ii) based on said evaluations, controlling a thermostatic valve disposed in the coolant circuit and communicating a signal to a fan control device that controls operation of a fan which cools coolant in a radiator as a function of a target temperature,
  (iii) setting the target temperature of the fan control device to either a predetermined low value or a predetermined high value through said communicated signal from the thermostatic control device, the predetermined low value being less than the predetermined minimum operating temperature, and
  (iv) communicating a signal to the fan control device and prohibiting operation of the fan by the fan control device only when the coolant temperature does not exceed the predetermined minimum operating temperature.

6. A method of operating a thermostatic valve control device of a cooling circuit of a coolant for an internal combustion engine of a motor vehicle, comprising first performing a set-up routine and then performing a main routine:

(a) wherein the set-up routine includes the step of accessing from a memory associated with the thermostatic valve control device threshold values for coolant temperature and for operating parameters of the internal combustion engine and the motor vehicle; and (b) wherein the main routine includes the steps of,
  (i) evaluating both the temperature of the coolant against a threshold value therefor representing a predetermined maximum operating temperature, and the parameters of the internal combustion engine and the motor vehicle against the threshold values therefor,
  (ii) based on said evaluations, controlling a thermostatic valve disposed in the coolant circuit and communicating a signal to a fan control device that controls operation of a fan which cools coolant in a radiator as a function of a target temperature, and
  (iii) setting the target temperature of the fan control device to either a predetermined low value or a predetermined high value through said communicated signal from the thermostatic control device, the predetermined high value being less than the predetermined maximum operating temperature,
  (iv) wherein said thermostatic control valve is opened and said target temperature is set to the predetermined low value whenever the coolant temperature exceeds the predetermined maximum operating temperature.

7. A method of operating a thermostatic valve in combination with a radiator fan of a coolant cooling circuit for an internal combustion engine of a motor vehicle, a fan control device controlling output of the radiator fan as a function of a target temperature settable to a predetermined high value and predetermined low value, the method comprising the steps of first performing a set-up routine and then repeatedly performing a main routine, (a) wherein the set-up routine includes the step of accessing from a memory both (i) threshold values for coolant temperature, including first and second predetermined minimum operating temperatures each being less than the predetermined low value for the target temperature, and a maximum operating temperature less than the predetermined high value for the target temperature, and (ii) threshold values for operating parameters of the internal combustion engine and the motor vehicle; and (b) wherein the main routine includes the sequential steps of (i) sensing the coolant temperature, (ii) inhibiting actuation of the radiator fan only if the coolant temperature is less than the first predetermined minimum operating temperature, and (iii) then,
  (A) maintaining the thermostatic valve in an open position, setting the target temperature of the fan control device to the predetermined low value, and restarting the main routine, if the coolant temperature exceeds the predetermined maximum operating temperature,
  (B) restarting the main routine if both a parameter exceeds a threshold value and the coolant temperature does not exceed the second predetermined minimum operating temperature,
  (C) setting the target temperature to the predetermined low value, maintaining the thermostatic valve in an open position, and restarting the main routine if both a parameter exceeds a threshold value and the coolant temperature exceeds the second predetermined minimum operating temperature, and
  (D) otherwise maintaining the thermostatic valve in a closed position, setting the target temperature of the fan control device to the predetermined high value, and restarting the main routine.

8. The method of claim 7, wherein the first predetermined minimum operating temperature is greater than the second predetermined minimum operating temperature.

9. The method of claim 8, wherein the setup routine further includes the initial setting of the target temperature of the fan control device to the predetermined high value.

10. The method of claim 7, wherein said maintaining of the thermostatic valve in the open position comprises the step of applying a current to an electrical heating element of the thermostatic valve.

11. The method of claim 10, wherein said application of the current when both a parameter exceeds a threshold value and the coolant temperature exceeds the second predetermined minimum operating temperature comprises the steps of, (a) initiating the application of an unpulsed current to the electrical heating element and initiating the measuring of a time period of the application of the unpulsed current with a time measuring device if no current is then being applied to the electrical heating element, and (b) applying a pulsed current to the electrical heating element in lieu of the unpulsed electrical current if the measured time period exceeds a predetermined time period.

* * * * *